F. W. RANDALL.
GRAIN-BINDER.

No. 190,515. Patented May 8, 1877.

2 Sheets—Sheet 1.

Attest:
Edward J. Tillotson
Geo. A. Johnson.

Inventor:
Frank W. Randall per.
Otto Lee Johnson
Atty.

F. W. RANDALL.
GRAIN-BINDER.
No. 190,515. Patented May 8, 1877.
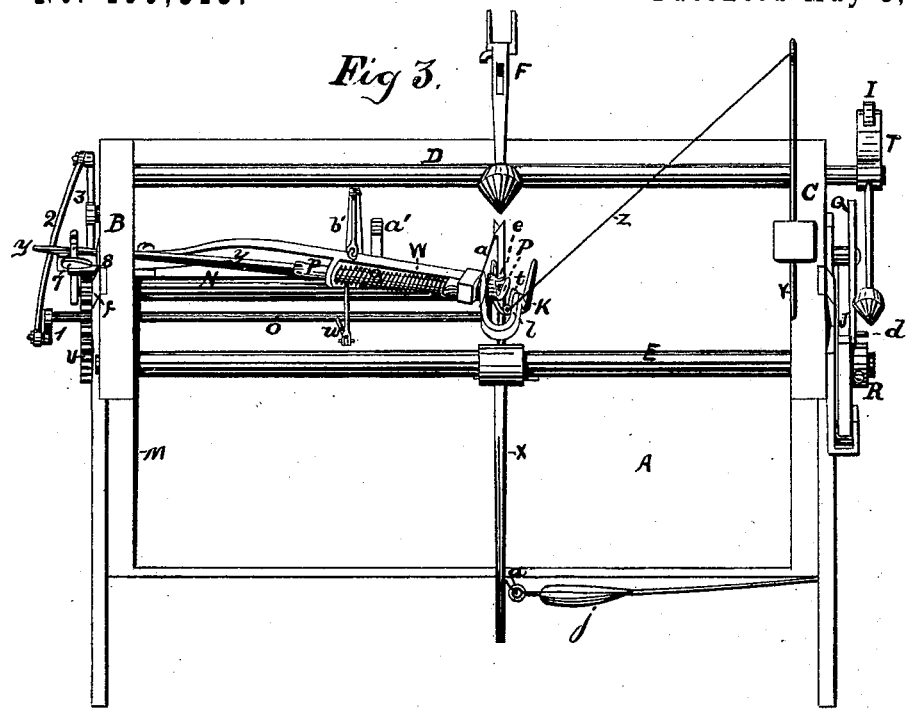
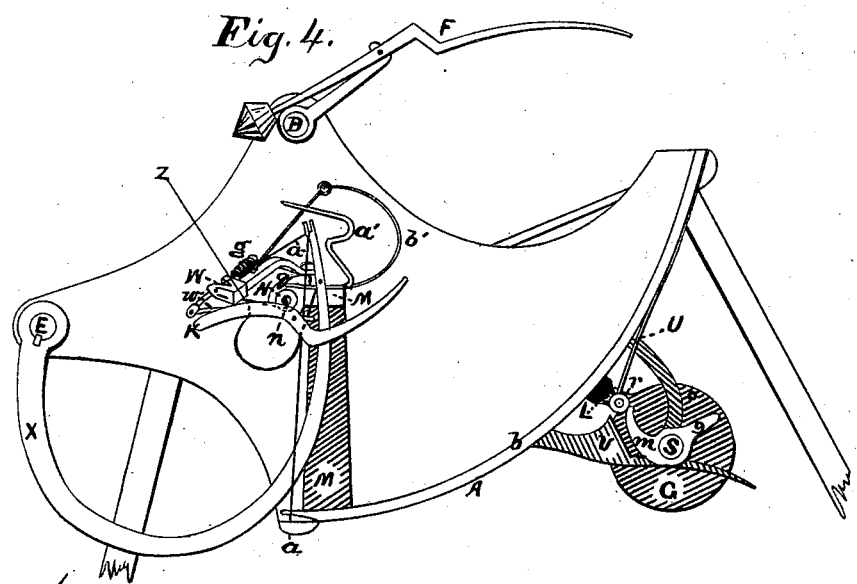
Attest:
Edward J. Tillotson
Geo. A. Johnson
Inventor:
Frank W. Randall per
Otto Lee Johnson
Atty.

UNITED STATES PATENT OFFICE.

FRANCIS W. RANDALL, OF BURLINGTON, MICHIGAN.

IMPROVEMENT IN GRAIN-BINDERS.

Specification forming part of Letters Patent No. 190,515, dated May 8, 1877; application filed January 3, 1877.

*To all whom it may concern:*

Be it known that I, FRANCIS W. RANDALL, of Burlington, in the county of Calhoun and State of Michigan, have invented certain new and useful Improvements in Twine Grain-Binders; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The subject of this invention is a twine grain-binding attachment, applied to the Marsh or other harvesters of its class; and consists in the construction, arrangement, and combination of parts, as hereinafter described and claimed.

Figure 1:
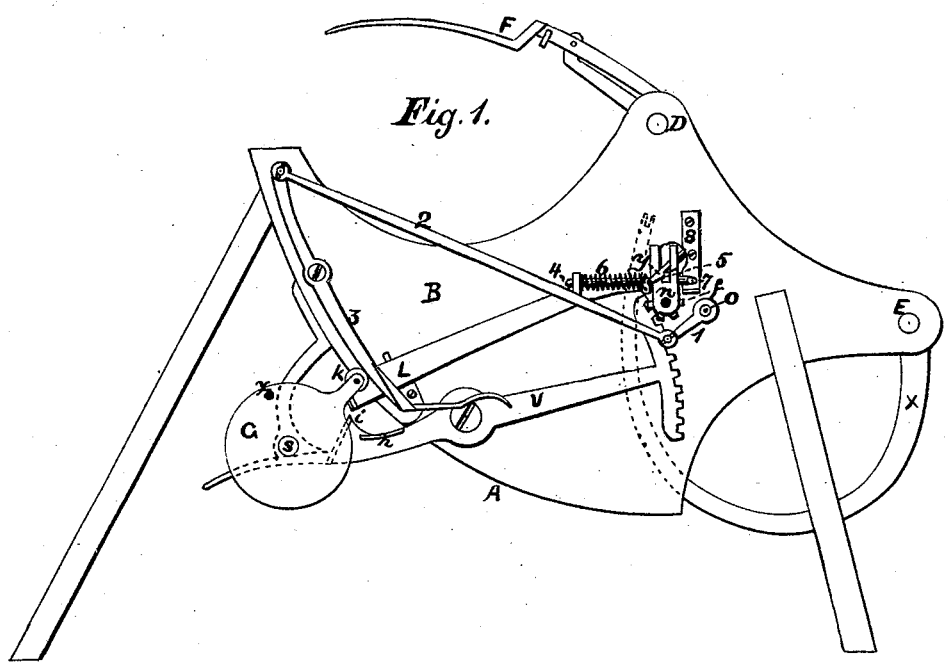
Figure 2:
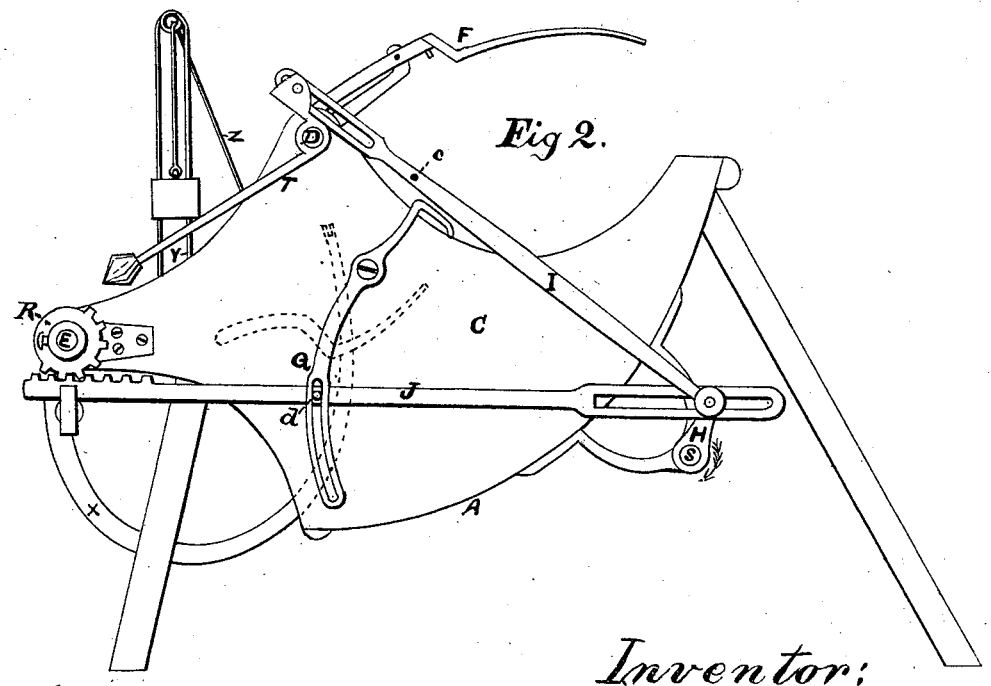

In the drawings, Figures 1 and 2 are end views. Fig. 3 is a side view. Fig. 4 is a side elevation.

The frame to which all the other parts are attached consists of a grain-table, A, approximating to that of a quadrantal shape, made solid and fastened to solid ends B and C, of similar shape, as shown in Figs. 1 and 2. Upper shaft D and side shaft E pass longitudinally across the machine, and are journaled in the ends B and C. The main driving-shaft S is hung in proper bearings beneath the grain-table A. To the projecting end of said shaft is keyed a wheel-crank, G, provided with a friction-roller, $k$, and stud $x$. To the forward end of the said shaft S is hung a crank, H, operating two slotted pitmen, I and J, as shown in Fig. 2 of the drawings, which represents the several parts of the machine in position for the commencement of the operation of gathering and tying the bundle. The main driving-shaft S, besides being furnished with the necessary driving-gear, is also provided with a double cam-wheel, operating the pivoted elbow L. The U-shaped arm X and pivoted gathering-arm F are keyed to the shafts E and D near the center of the frame A, grabber W, and rib $b$. Said arms X and F are operated by the crank H, slotted pitmen I and J, segmental wheel R, weighted lever T, and slotted swing-bar Q, engaging with the studs $c$ and $d$, all as shown in Fig. 2.

V is a segmental swing-bar, engaging with the pinion $f$ on cylinder N, and is provided with the flanges $h$ and $i$, and is operated by the friction-roller $k$ on wheel-crank G. The pivoted elbow L is attached to the rear end A of the machine, and placed just above the swing-bar X, as shown in Fig. 1, and is composed of two arms of nearly equal length.

The upper end of said elbow L is connected to the hooked rod $n$, which extends the whole length of the cylinder N, and said elbow L is also provided with a device for operating the knife and sliding jaw $p$ of the grabber, as will be hereinafter more fully described. To the outer end of the arm of said elbow L, passing beneath and parallel with the grain-table A, are attached a spring, U, and friction-roller $r$, engaging with, and operated by, the double cam, as shown in Fig. 4. The pitman 2 connects the crank 1 to the pivoted swing-bar 3.

M is an iron bracket, screwed to the end A, and extending forward nearly to the center of the machine, and has here welded to the end of it a forked head, K, which is so bent as to form a seat for the bundle, as clearly shown in Fig. 4, and also keeps said bundle in position while being bound. Said forked head is provided with a guide, $t$, and an eye, $l$, and supports the inner end of the cylinder N and shaft O, which pass through and project beyond the end A, in which they are journaled.

P is the knot-tier, formed on the inner end of the cylinder N by cutting a slightly-diagonal V-shaped groove across it, and sufficiently deep to receive the ends of the binding-cord $a$, and allow the hook-rod $n$, extending the whole length of and through the cylinder N, to slide over the ends composing said binding-cord. $e$ is a curved horn or lip projecting within the V-shaped groove. The outer end of the knot-tier P is properly rounded, so as to allow the binding-cord to work off from it in the operation of forming the knot. The U-shaped arm X has a slotted forked head of peculiar shape, and to the forward end is attached the compressing-cord Z, which passes up through the eye $l$ on the forked head K, from thence to an eye at the upper part of the standard Y, and is secured to the weight which slides thereon.

What I term the "grabber" consists of a bar of iron somewhat resembling the shape of an inverted sleigh-runner, pivoted to the bracket M near the rear end A of the machine, and provided with a sliding jaw, p, operated by the coil-spring g. A V-shaped groove is made in the head and the end of the grabber, in which the end of the continuous string is held and cut by a chisel-shaped knife riveted to, and projecting slightly beyond, the end of the sliding jaw p. The knife projects into a groove in the head of the grabber, as shown in Fig. 4. To the upper end or head of the pivoted elbow L is hung a rod, 4, with a hook, 5, formed thereon, and it is opposite a slot made in said head to receive the end of the notch-bar y, hinged to the sliding jaw p. The rod 4 is also provided at one end with a coiled spring, 6, and at the other with an arm, 7, which slides on the bracket 8, screwed to the end of the machine.

The office of the rib b is to keep the falling grain elevated from the grain-table, so as to allow the pivoted gathering-arm to collect the grain composing the bundle, and move it down to the compressing-cord Z. j is a weighted lever to take up the slack in the binding-cord. The swing-bars V and 3 are properly curved at their lower ends, so as to give the proper motion to the cylinder N and grabber W. The spool on which is wound the binding-cord may be placed at any convenient point beneath the grain-table A. And my machine is "threaded," as I term it, by passing the end of the binding-cord through an eye in the weighted lever or tension j; thence up through a hole made in the grain-table A and rib b to the grabber; insert the binding-cord a, with the end downward, in the V-shaped groove made in the head of the grabber, disconnecting the notch-bar y from the rod 4 by lifting it from the hook on said rod.

My grain-binder is suspended on a rod attached to that portion of the frame-work of the harvester situated beneath the grain or straw carrier, and by means of levers within reach of the driver my binder is slid on said rod, so as to bind the bundle at any particular point, and by the use of another lever and a clutch the binding mechanism may be disconnected from the driving-wheel keyed to the main shaft. In going to and from the field, or where the standing grain is light, by disconnecting the binder the harvester may be run until a sufficient quantity of grain has fallen on the quadrantal table to form the usual-sized bundle.

Having described the construction and arrangement of my machine, I will now proceed to describe the operation, which is as follows: The crank H on the forward end of the main driving-shaft S, turning in the direction of the arrow, operates the weighted lever T by the pitman I, moving the pivoted gathering-arm F down the grain-table, carrying the grain composing the bundle against the binding-cord, when the forked head of the U-shaped arm X, operated by the pitman J, passing beneath the bundle, catches the binding-cord and carries it around the bundle, and to a sufficient height to be received by the head of the grabber W, which now moves forward, carrying the two ends composing the band into the knot-tier P. The friction-roller now moves off the cam m, when the spring U throws the hook-bar forward over the cords in the knot-tier, holding them in place. The knot-tier is now revolved by the segmental swing-bar V, causing the bands to cross each other and form a loop. By a back turn of the knot-tier the ends of the binding-cord pass into the hook on the hook-rod n. At this juncture the cam 9 operates the pivoted elbow L, drawing the loop thus formed within and against a pin in the head of the knot-tier. This same operation opens the jaw p of the grabber, and when the arm 7 passes off the bracket 8, the jaw flies backward, performing the double operation of cutting the cords composing the band and grabbing the end of the continuous cord, when the U-shaped arm recedes and the bundle drops to the ground.

Having described both the construction and operation, what I claim as my invention is—

1. In a grain-binding machine, the main driving-shaft S, provided with a crank, H, crank-wheel G, and double cam 9 m, in combination with the pitmen I and J, swing-bar Q, weighted lever T, and gathering-arm F, spring U, pivoted elbow L, segmental swing-bar V, pivoted swing-bar 3, with pitman 2, crank 1, shaft O, bracket M, rod n, notch-bar y, grabber W, U-shaped arm X, compressing-cord Z, forked head K, and knot-tier P.

2. Crank H, slotted pitmen I and J, weighted lever T, in combination with the slotted swing-bar Q, studs c and d, U-shaped arm X, compressing-cord Z, gathering-arm F, rib b, and grain-table A.

3. The pivoted elbow L, rod 4, hook 5, arm 7, in combination with the bracket 8, notch-bar y, and grabber W.

4. The knot-tier P, segmental swing-bar V, flanges h and i, and wheel-crank G, friction-roller K, stud x, in combination with swing-bar 3, pitman 2, crank 1, shaft O, lever w, and grabber W.

In testimony that I claim the foregoing as my own I affix my signature in presence of two witnesses.

FRANCIS W. RANDALL.

Witnesses:
GEO. A. JOHNSON,
ANNA M. WALTER.